March 12, 1968 C. R. LINSLEY 3,372,962
SPINDLE APPARATUS USEFUL WITH ROTATING MEMORY DISCS
Filed Feb. 21, 1966
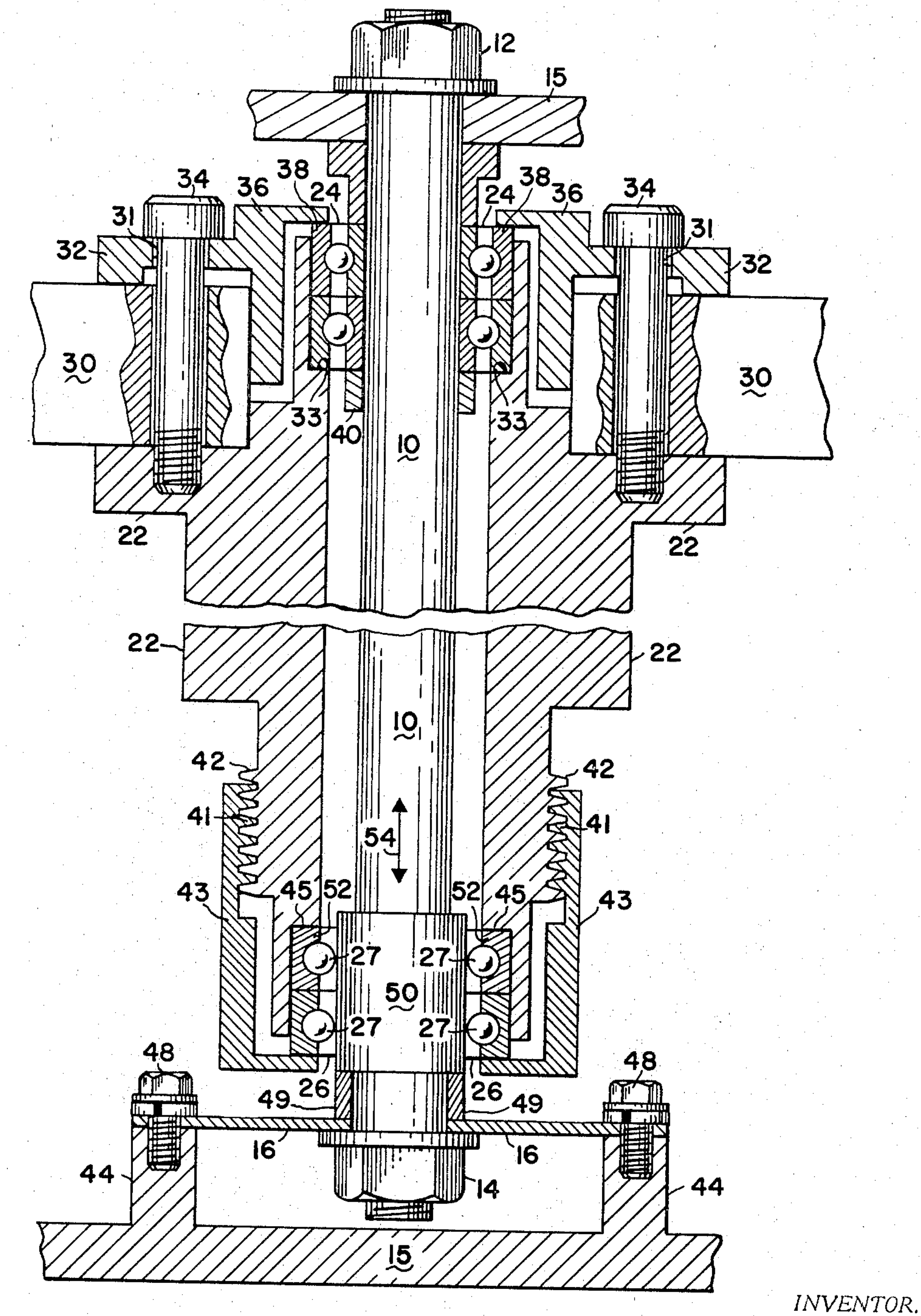
INVENTOR.
CLARENCE R. LINSLEY
BY Joseph R. Dwyer
ATTORNEY United States Patent Office 3,372,962

Patented Mar. 12, 1968

3,372,962
SPINDLE APPARATUS USEFUL WITH ROTATING MEMORY DISCS

Clarence R. Linsley, La Crescenta, Calif., assignor to General Precision Systems Inc., a corporation of Delaware Filed Feb. 21, 1966, Ser. No. 528,892
2 Claims. (Cl. 308—184)

ABSTRACT OF THE DISCLOSURE

A temperature compensating spindle construction for rotating memory discs. The disc-carrying end of a hollow, rotating spindle is supported upon an inserted stationary shaft by a bearing fixed on the shaft near one end. The other end of the spindle is supported upon the shaft by a ball bearing whose inner race is an ungrooved cylindrical surface carried by the shaft adjacent its other end. The disc end of the shaft is fixed in a supporting structure and its other end is secured to a radially rigid but axially flexible diaphragm fixed to the supporting structure.

This invention relates to spindle apparatus useful with rotating memory discs or the like, and more particularly, to a novel and improved spindle which is movable relative to a shaft and which utilizes a unique bearing arrangement which allows longitudinal expansions and contractions due to temperature variations in the shaft/spindle arrangement.

A serious problem in rotating memory discs is that heat from external and internal sources may cause longitudinal expansion and contraction and stress on the shaft or spindle. It is important in disc memories that the center of the rotating disc, and especially those of considerable size and weight, be constrained to a particular point in space to assure positional accuracy, and in turn, to maintain high bit density. Therefore, any differential expansions and contractions of the spindle apparatus must be accounted for without movement of the exact center of the disc. This is accomplished by allowing other parts in the spindle apparatus to move relative to this particular point along the axis of rotation of the disc and without sliding movement between the parts. Any sliding movement is objectionable because it may cause a binding between the parts and thus disturb the rotational axis of the disc.

It, therefore, becomes one object of this invention to provide a spindle for a rotating memory disc or the like, wherein the spindle is coupled to and relatively movable with respect to a shaft, thereby providing means for preventing longitudinal stress between the shaft and the spindle.

Another object of this invention is to provide a spindle arrangement which is capable of assuring that the center of rotation of a memory disc or the like is maintained constant at a particular point in space.

These and other objects will become apparent when considered with the specification and the accompanying drawings.

Briefly described, this invention comprises a spindle bearings 24, a pair of lower bearings 26 and may be driven The inner face of a bearing is removed and replaced in function by the shaft itself, which has no groove for the bearing balls. Thus, if there is longitudinal movement of the shaft due to temperature variations, the balls of the ball bearing can shift longitudinally on the shaft to alleviate any possible stress that might be introduced by reason of expansion and contraction. Further, a flexible diaphragm supports one end of the shaft and is affixed to supporting structure so that upon longitudinal movement of the shaft, the diaphragm will flex without sliding movement between it and the shaft to prevent binding between the parts.

In the drawings, which show one preferred embodiment of this invention wherein the single figure is a cross sectional view showing the construction of the spindle apparatus of this invention.

Turning now to a more detailed description of this invention, there is shown in FIGURE 1 a stationary shaft 10 which is secured to a suitable supporting structure 15 by the nuts 12 and 14 and which has one end firmly affixed to a diaphragm 16. A spindle 22 is rotatably mounted on the shaft 10 by means of a pair of upper bearings 24 and a pair of lower bearings 26 and may be driven by an electric motor or the like.

Spindle 22 is connected to a memory disc 30 by means of clamp 32 which is bolted to disc 30 by bolts 34 which are threaded into spindle 22. The clamp 32 has a flange 36 which extends over the outer race 38 of control bearing 24 to provide bearing preload which may be of the conventional matched pair type.

Spindle 22 has a ledge 33 thereon which control bearings 24 will rest upon when pressure is brought to bear upon the clamp 32 when bolt 34 is screwed into spindle 22. A bearing such as this will provide for longitudinal positioning of shaft 10 by clamp 32 bearing axially upon the bearings 24. The inner races of bearing 24 rest upon a collar 40 fixed to the shaft 10.

The other end of spindle 22 which faces diaphragm 16 has threads 41 to receive threads 42 of the threaded cap 43 which holds bearing 26 securely to ledge 45. The bottom of the support 15 may have a ledge support 44 which holds the diaphragm 16 above support 15. The outer periphery of diaphragm 16 is firmly affixed to support 15 by bolts 48 threaded into ledge supports 44. A spacer 49 is provided between a ledge formed by a collar portion 50 on the shaft and the diaphragm 16, to assure axial restraint of the shaft 10.

The bearing balls 27 make contact with the collar portion 50 of the shaft 10. The outer race 52 of bearing 26 is a conventional type and is firmly affixed to spindle 22. The inner race of bearing 26 is provided by the cylindrical collar portion 50 of the shaft 10, there being no grooves to receive the balls 27 of the bearings 26. It should be understood that the collar portion 50 is for convenience, and that the bearings 26 could easily ride on a shaft such as shaft 10 without a raised portion.

By the arrangement shown and described herein, if a physical and longitudinal stress is applied to the shaft 10, as depicted by the arrow 54, the diaphragm 16 in which the shaft 10 is coupled will flex to provide the proper give to accommodate this longitudinal stress. Because bearing 26 has the floating race as provided by the collar portion 50, and because of the lack of grooves which are normally found in the inner race, the balls of bearing 26 will track up and down upon shaft 10 to compensate for longitudinal movement due to temperature variations. Any tendency toward binding in control bearing 24 is minimized by the flexure of the diaphragm 16 in conjunction with the longitudinal movement of bearing 26.

Having thus described one embodiment of this invention, what is claimed is:

1. A spindle assembly including:
a spindle;
a shaft mounted for relative movement between it and said spindle;
bearing means positioned between said shaft and said spindle;
a first race for said bearing means having a groove within its inner periphery, said bearing means being disposed within said groove;

a uniformly cylindrical surface providing a second race for said bearing means, said second race being disposed about the periphery of said shaft and being located within said first race;

support means; and a flexible member secured to said support means, one end of said shaft being affixed to said support means and the other end of said shaft being secured to said flexible member.

2. A spindle assembly as defined in claim 1, wherein:

said flexible member is a diaphragm capable of concave and convex flexure; and said shaft is fixedly mounted to said diaphragm near the center of said concave and convex flexure of said diaphragm.

References Cited

UNITED STATES PATENTS

| | | | |
|---|---|---|---|
| 2,216,888 | 10/1940 | Machlett | 308—176 |
| 2,625,664 | 1/1953 | Agule | 308—184 |

MARTIN P. SCHWADRON, *Primary Examiner.*

FRANK SUSKO, *Examiner.*